United States Patent
Fiebig et al.

(10) Patent No.: US 9,286,060 B2
(45) Date of Patent: Mar. 15, 2016

(54) LIFECYCLE MANAGEMENT SYSTEM WITH CONDITIONAL APPROVALS AND CORRESPONDING METHOD

(71) Applicant: Software AG, Darmstadt (DE)

(72) Inventors: Thorsten Fiebig, Mannheim (DE); Gary Woods, Seeheim (DE); Daniel Adelhardt, Bockhorn (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 13/950,988

(22) Filed: Jul. 25, 2013

(65) Prior Publication Data

US 2014/0380267 A1 Dec. 25, 2014

(30) Foreign Application Priority Data

Jun. 24, 2013 (EP) .................................... 13173358

(51) Int. Cl.

| | |
|---|---|
| *G06F 9/44* | (2006.01) |
| *G06Q 10/00* | (2012.01) |
| *G06Q 10/06* | (2012.01) |
| *G06Q 10/10* | (2012.01) |
| *G06F 9/445* | (2006.01) |

(52) U.S. Cl.
CPC .. *G06F 8/70* (2013.01); *G06F 8/00* (2013.01); *G06F 8/71* (2013.01); *G06Q 10/06* (2013.01); *G06Q 10/103* (2013.01); *G06F 8/60* (2013.01)

(58) Field of Classification Search
None
See application file for complete search history.

(56) References Cited

U.S. PATENT DOCUMENTS

| | | | | |
|---|---|---|---|---|
| 6,161,147 A | * | 12/2000 | Snyder et al. | ................. 719/310 |
| 6,345,387 B1 | * | 2/2002 | Morrison | ...................... 717/170 |
| 7,131,071 B2 | | 10/2006 | Gune et al. | |

(Continued)

FOREIGN PATENT DOCUMENTS

EP    1 898 345    3/2008

OTHER PUBLICATIONS

Hondo, M., et al., "SOA Policy Management", IBM Corp. [online], 2008 [retrieved Jan. 8, 2016], Retrieved from Internet: <URL: http://www.redbooks.ibm.com/redpapers/pdfs/redp4463.pdf>, pp. 1-20.*

(Continued)

*Primary Examiner* — Todd Aguilera
(74) *Attorney, Agent, or Firm* — Nixon & Vanderhey PC (57) ABSTRACT

Certain example embodiments concern a lifecycle management system for at least one computing component. A lifecycle model, including lifecycle states assignable to the at least one computing component, is defined. The lifecycle states include a production state. The lifecycle management system ensures the at least one computing component can be productively used only if it is assigned the production state. A lifecycle transition request assigning a requested target lifecycle state of the lifecycle model to the at least one computing component is received. A conditional lifecycle state, different from the requested target lifecycle state, is assigned to the at least one computing component. At least one condition to be fulfilled for the at least one computing component to be assigned the requested target lifecycle state is assigned. The requested target lifecycle state is automatically assigned to the at least one computing component when the at least one condition is fulfilled.

19 Claims, 6 Drawing Sheets

(56) References Cited

U.S. PATENT DOCUMENTS

| | | |
|---|---|---|
| 7,415,483 B2 * | 8/2008 | Kuntz-Mayr et al. |
| 7,509,627 B1 * | 3/2009 | Ayachitula et al. ........... 717/101 |
| 7,761,851 B2 * | 7/2010 | Bailey et al. .................. 717/121 |
| 8,126,760 B2 * | 2/2012 | Kelly et al. ................... 705/7.27 |
| 8,176,092 B2 * | 5/2012 | Kriegesmann ................ 707/802 |
| 8,239,819 B2 | 8/2012 | Hafermann et al. |
| 9,195,446 B2 * | 11/2015 | Fiebig et al. |
| 2004/0139104 A1 * | 7/2004 | Kuntz-Mayr et al. ..... 707/103 R |
| 2007/0006122 A1 * | 1/2007 | Bailey et al. .................. 717/101 |
| 2007/0088585 A1 | 4/2007 | Maguire |
| 2010/0095266 A1 | 4/2010 | Novak |
| 2010/0114618 A1 * | 5/2010 | Wilcock et al. ................. 705/7 |
| 2011/0314439 A1 | 12/2011 | Colgrave et al. |
| 2012/0296893 A1 * | 11/2012 | Nadgir et al. ................. 707/722 |
| 2013/0219361 A1 * | 8/2013 | Fiebig et al. .................. 717/121 |
| 2014/0222523 A1 * | 8/2014 | Vairavan et al. ............. 705/7.36 |

OTHER PUBLICATIONS

[Online], WSI Web Services Interoperability Organization, http://www.ws-i.org/, printed Jul. 22, 2013, 1 page.

[Online], CentraSite Free Download Center, http://www.centrasite.com/, printed Jul. 22, 2013, 1 page.

[Online], HP SOA Systinet: http://www8.hp.com/us/en/software/software-product.html?compURI=tcm:245-936884, printed on Jul. 22, 2013, 8 pages.

[Online], SOA Software, "Powering the API Economy", http://www.soa.com/, printed on Jul. 22, 2013.

[Online], WSRR, http://www-01.ibm.com/software/integration/wsrr/#, printed on Jul. 22, 2013, 2 pages.

[Online], Java, http://www.oracle.com/technetwork/java/index.html, printed on Jul. 22, 2013, 2 pages.

[Online], API management, http://searchcloudapplications.techtarget.com/definition/API-management, printed on Jul. 22, 2013, 13 pages.

* cited by examiner

LIFECYCLE MANAGEMENT SYSTEM WITH CONDITIONAL APPROVALS AND CORRESPONDING METHOD

This application claims priority to EP Application No. 13 173 358.6, filed 24 Jun. 2013, the entire contents of which is hereby incorporated by reference.

1. TECHNICAL FIELD

Certain example embodiments relate to the lifecycle management of computing components, and more particularly to a lifecycle management system and a corresponding method for managing the lifecycle of at least one computing component with conditional approvals.

2. BACKGROUND AND SUMMARY

Service-oriented architecture (SOA) is a software design and software architecture design pattern based on structured collections of discrete computing components or software modules, known as services, that collectively provide the functionality of a large software application. The purpose of SOA is to allow an easy cooperation of a large number of computers that are connected over a network, such as the Internet. Every computer can run an arbitrary number of programs, called services in this context, that are built in a way that they can exchange information with one another without the need to make changes to the underlying program itself. In a SOA, resources are made available to participants in the network as independent services that the participants can access in a standardized way. Whereas most definitions of a SOA use SOAP requests conveyed via HTTP or HTTPS over TCP/IP, a SOA may use any web service-based technology. The web services interoperate based on formal definitions which are independent from the underlying platform and programming language. The interface definition encapsulates the specific implementations, so that a SOA is independent of a specific development technology (such as Java and .NET). The software components thus become very reusable because the interface is standards-compliant and is independent from the underlying implementation of the web service logic. In this context, SOA is nowadays one of the preferred architecture paradigms for fulfilling the needs of fast changing business requirements. It provides more agility by splitting monolithic applications into components that can be re-used and orchestrated to get new functionality on demand. New or changed business processes can be implemented by combining existing services or other types of SOA assets. The person skilled in the art will appreciate that SOA is not only popular for implementing business applications/processes, but likewise for implementing complex technical systems, such as the distributed controlling logic of a large assembly line in a factory, or large distributed computing systems which serve for processing large data sets, such as weather forecast models or gene analysis models.

In summary, the implementation of a distributed SOA-based computing system leads to a vast collection of distributed and loosely coupled computing components, such as services. However, the individual computing components are typically developed individually, so that at any given time, the components of a SOA-based system may be in different phases, i.e. one component may already be in productive use, another component may be still being tested, and yet another component may be under development. In other words, the individual computing components undergo a series of distinct phases during their lifetime, which is called a "lifecycle". In this context, lifecycle management, i.e. the controlling of the correct transition of the computing components from one lifecycle state to the next is a complex and difficult task. It goes without saying that if a computing component is set to productive although the necessary tests have not been passed, this could lead to catastrophic consequences, such as the failure of the overall computing system. Managing the lifecycle of services and other SOA assets is thus a critical requirement when governing a Service Oriented Architecture, i.e. when controlling its correct behavior.

Another emerging application area for lifecycle management is API (Application Programming Interface) management. API management enables organizations to publish and promote their APIs in a large scale environment such as the Internet. Since such APIs are typically exposed to a large community of users, managing the lifecycle of API assets is a very important feature of API management solutions.

Figure 1A:
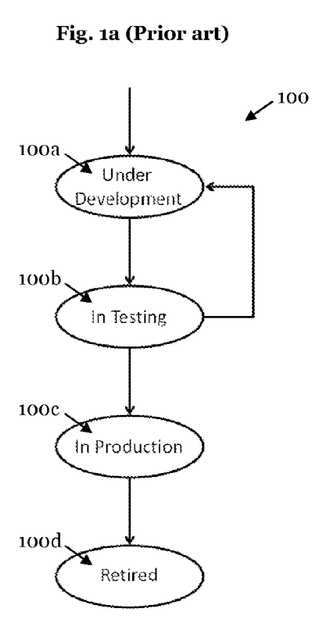
FIG. 1*a*: An exemplary lifecycle model with typical lifecycle states according to the prior art.

Lifecycle management is typically performed on metadata stored in a registry, wherein such metadata represents the SOA and/or API assets the lifecycle of which should be managed, i.e. controlled. Due to its importance for the correct operation of the underlying computing system, lifecycle management capabilities are nowadays provided by several existing SOA governance and API management products, e.g., CENTRASITE of applicant, WEBSPHERE Service Registry and Repository (WSRR) of IBM, SYSTINET Registry of HP and Lifecycle Manager of SOA Software. In a SOA registry lifecycles are typically represented with a lifecycle model. A lifecycle model typically comprises lifecycle states that can be assigned to SOA and API assets. The lifecycle states are connected via lifecycle state transitions, which define the allowed state changes an asset can run through. A simple lifecycle model (LCM) 100 is shown in FIG. 1a and comprises the lifecycle states "Under Development" 100a, "In Testing" 100b, "In Production" 100c, and "Retired" 100d.

Applying this lifecycle model to the managed assets, i.e., computing components such as services, ensures that all assets are in one of the four states. In the example of FIG. 1a, the initial state is "Under Development" 100a from there services can be moved to "In Testing" 100b. Services in the "In Testing" 100b state can either be moved back to "Under Development" 100a or they can be moved to "In Production" 100c. Once services have reached their end of lifetime they can be moved from "In Production" 100c to "Retired" 100d. Complex lifecycle models not only comprise lifecycle states but may also lifecycle stages which in turn comprise a plurality of nested lifecycle states. Lifecycle stages are needed in advanced development environments where SOA assets do not just run through multiple states but also through multiple stages. Hereinafter, it will not be distinguished between state and stage transitions for the sake of simplicity.

To provide a computer-aided management of the lifecycle, policies can be assigned to the transitions of a lifecycle model. Simple policies may define a condition to make sure that an asset can only run through a lifecycle transition if it fulfills one or more requirements. For example, only those services can be moved to "In Production" that are WS-I (Web Services Interoperability) compliant. More advanced policies may not only check conditions, but may also trigger actions. For example, a policy may perform an automatic deployment of a Web service once said Web service is assigned the "In Testing" or "In Production" lifecycle state. This policy can thus be used to annotate the transitions pointing to the "In Testing" and "In Production" states, so that the respective asset is automatically deployed to a testing or production environment.

Figure 1B:
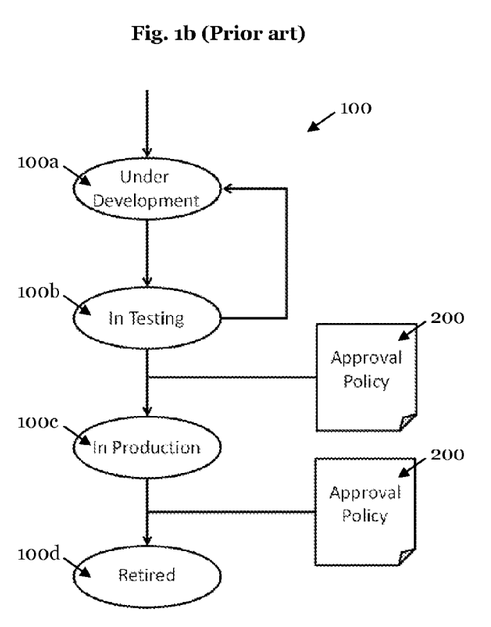
FIG. 1b: The lifecycle model of FIG. 1a with attached approval policies.

It is apparent from the foregoing that changing the lifecycle state of assets can have a significant impact on the operation of the underlying computing system. Therefore, dedicated governance, i.e., controlling or management, of the lifecycle transitions is needed. An effective method is to apply approval processes. For example, users and/or groups of users may request a lifecycle transition for a single or a collection of assets. Such a request may raise an approval request to more privileged users or groups such as SOA architects responsible to review all the assets that are entering the "In Production" 100c state. The approving users or approving group can approve or reject the requested transition. In the prior art, approvals are typically defined by attaching approval triggering policies to lifecycle transitions. When such a policy is configured an approval process is triggered once the transition is requested for an asset. The approval process triggered by the approval policies may be simple (such as the sending of an email to the responsive approving user/group) or may comprise a complex process workflow. If the approval process is successful the asset changes its lifecycle state or stage according to the requested transition. If the approval is rejected the asset stays in source state or stage of the requested transition. FIG. 1b shows the exemplary lifecycle model 100 of FIG. 1a with two approval policies controlling the transition from "In Testing" 100b to "In Production" 100c and from "In Production" 100c to "Retired" 100d.

This prior art approach of allowing to either approve or reject a requested lifecycle state transition is provided already in the existing SOA governance and API management products mentioned further above. Likewise, also the U.S. Pat. No. 7,131,071 B1 titled "Defining an approval process for requests for approval", which proposes a system for defining an approval process graphically, does not disclose how to integrate approval processes with lifecycle management, in particular not beyond the options to approve or reject an approval request. US patent application 2007/0088585 A1 titled "Capturing the result of an approval process/workflow and declaring it a record" describes how the results of approval processes can be captured to collect log and history information. This information enables the tracking of approval workflow states, but the patent application does not describe how this can be combined with lifecycle management. Further, the U.S. Pat. No. 8,239,819 B2 titled "Method and system for managing the lifecycle of a service oriented architecture" of applicant and the related European patent 1 898 345 B1 of applicant discloses a method and system for performing complex lifecycle management in SOA registries, but also proposes only options for rejecting or accepting lifecycle transitions. Finally, the US patent application 2011/0314439 A1 titles "Software approval process using service governance" shows how lifecycle management and approvals can be used to automatically deploy SOA assets, such as web services.

However, the prior art approach of providing only the option to reject or accept a requested lifecycle transition makes the approval quite inflexible. For example, when requesting to move an asset into the "In Production" lifecycle state, the approver could generally agree to the requested transition, but may want additional tests to be executed before moving the asset. With the capability of only approving or rejecting the requested transition, the approver has to reject the transition or wait with the approval until the additional tests have been performed. Rejecting the transition, however, does not cover the approver's intention. Moreover, once rejected, the transition has to be requested again later on and the approval process has to be performed again, which wastes processing time and resources. On the other hand, waiting with the approval until the testing has been done also does not cover the intention of the approver. Moreover, the approver has to do the final approval once the testing is completed, which again creates unnecessary waiting times and requires processing resources and time that could be used more productively.

It is therefore the technical problem underlying certain example embodiments to provide an approach for controlling the lifecycle transitions of distributed computing components in a more efficient and flexible, yet secure way, thereby at least partly overcoming the above explained disadvantages of the prior art.

This problem is according to one aspect solved by a lifecycle management system for at least one computing component. In the embodiment of claim 1, the lifecycle management system comprises:

a. means for defining a lifecycle model comprising a plurality of lifecycle states which can be assigned to the at least one computing component;

b. wherein the plurality of lifecycle states comprises a production state and wherein the lifecycle management system ensures that the at least one computing component can be productively used only if it is assigned the production state;

c. means for receiving a lifecycle transition request for assigning a requested target lifecycle state of the lifecycle model to the at least one computing component;

d. means for assigning a conditional lifecycle state to the at least one computing component which is different from the requested target lifecycle state, and for specifying at least one condition that has to be fulfilled in order for the at least one computing component to be assigned the requested target lifecycle state; and e. means for automatically assigning the requested target lifecycle state to the at least one computing component when the at least one condition is fulfilled.

Accordingly, the embodiment defines a lifecycle management system operating on a lifecycle model which ensures that the managed computing component(s) can only transition from one lifecycle state to the next in a controlled manner. This is achieved in that the lifecycle management system is adapted for interpreting one or more conditions (e.g. defined in one or more policies) assigned to the lifecycle state transitions connecting the lifecycle states and for allowing the assignment of a requested lifecycle state (target lifecycle state) to a computing component only if the respective condition(s) (e.g. defined in the policy/policies) is/are fulfilled. In particular, one of the lifecycle states of the lifecycle model is a productive state (hereinafter also referred to the "In Production" state) and the lifecycle management system ensures that a computing component can only be productively used, i.e. used and/or called by another computing component, if it is assigned the production state.

Certain example embodiments depart from the inflexible approach known from the prior art to provide only the option to either approve or reject a given lifecycle transition request. To this end, the lifecycle management system of certain example embodiments allows what is hereinafter called "conditional approvals", which involves the ability to choose the target lifecycle state for a requested lifecycle transition and thus makes the lifecycle management more flexible and efficient. Choosing the target lifecycle state may be accomplished by either selecting a target lifecycle state from a plurality of pre-defined potential target lifecycle states (which may be foreseen in the lifecycle model), or by defining a new target lifecycle state (i.e. the lifecycle model is dynamically extended at runtime).

In any case, instead of just accepting or rejecting a requested lifecycle transition, certain example embodiments allow to assign a lifecycle state to the at least one computing component which is different from the requested target lifecycle state. The different lifecycle state is in this context called a conditional lifecycle state and the lifecycle management system allows for specifying at least one condition that has to be fulfilled in order for the at least one computing component to be assigned the requested target lifecycle state.

Accordingly, an approval process executed by means of the inventive lifecycle management system offers the approving user and/or group three options: The "Direct Approval" option follows the requested transaction and moves the asset to the requested lifecycle state. The "Reject" option moves the asset back to the original lifecycle state. The third option involves an additional lifecycle state and defines additional criteria for the computing component to be fulfilled before the requested lifecycle state is assigned. Once this/these condition(s) is/are fulfilled, the lifecycle management system automatically assigns the requested target lifecycle state to the at least one computing component. In summary, this provides for a more flexible and efficient handling of requested lifecycle transitions, while it is still ensured that the computing components only evolve through their lifecycles in a controlled and consistent manner, so that the proper operation of the underlying computing system is ensured.

In one aspect, the lifecycle management system is adapted for automatically deploying the at least one computing component to a productive environment when the at least one computing component is assigned the production state. Accordingly, it is ensured that other computing components cannot use a computing component unless it is present in the productive environment.

In another aspect, the at least one condition is defined in at least one policy and comprises at least one parameter, the value of which can be specified by an approving entity. Accordingly, this aspect provides not only fixed policies but policies that can be parameterized, leading to more flexibility and customizability of the lifecycle management. For example, a testing policy may provide a parameter that allows specifying the tests that have to be executed, and/or a runtime invocation policy may provide a duration parameter for specifying a monitoring time period.

Furthermore, at least one policy associated with the lifecycle transition request may comprise a plurality of conditions, and the lifecycle management system may be adapted for ensuring that the at least one computing component is assigned the requested target lifecycle state, if any of the plurality of conditions is fulfilled, or if all of the plurality of conditions are fulfilled. This is particularly advantageous in case an approval has to be given by a group of users, wherein the decisions of the approving users have to be consolidated. It will be appreciated that the use of policies is optional and that any other equivalent means to define certain conditions is suitable.

Preferably, the lifecycle management system comprises a registry which stores a description of the at least one computing component, wherein the description comprises a lifecycle property which indicates the current lifecycle state of the computing component. Even more preferably, the lifecycle management system further comprises an event channel and a policy engine, wherein the registry is adapted for issuing an event on the event channel indicating a lifecycle transition request for the at least one computing component, and wherein the policy engine is adapted for consuming the event and for processing the lifecycle transition request in accordance with at least one associated policy. Accordingly, the lifecycle management is in this aspect implemented based on the event-driven architecture (EDA) paradigm, which allows for a particularly timely processing of the lifecycle management, as well as for improved extensibility, as will be further explained in the detailed description further below.

In one example, the requested target lifecycle state is the production state, the conditional lifecycle state is an extended testing state and the at least one condition of at least one associated policy specifies at least one test that has to be passed by the computing component before it is assigned the production state. This aspect ensures that computing components are only propagated to the productive state (and become usable by third parties) when all necessary tests have been successfully passed. In addition or alternatively, the requested target lifecycle state may be an out of production state (also referred to as "Retired" state), the conditional lifecycle state may be a retirement pending state, and the at least one condition of at least one associated policy may specify that the computing component can be assigned the out of production state, if it is not invoked for a defined time period. Accordingly, this aspect ensures that a given computing component is only set to "out of production" when it is no longer used by third parties, thereby again ensuring the proper operation of the underlying computing system.

As already mentioned further above, the at least one computing component may be a Service-oriented architecture, SOA, asset, such as a Web service, and/or an Application Programming Interface, API, asset. Also, the lifecycle model may comprise at least one lifecycle state which comprises a plurality of nested lifecycle states. Accordingly, a lifecycle state may be a "lifecycle stage" which in turn comprises multiple lifecycle states, i.e. a lifecycle stage may define a sub-process within the overall lifecycle model.

Certain example embodiments also provide a computer-implemented method for managing the lifecycle of at least one computing component by a lifecycle management system. In the embodiment of claim 11, the method comprises the steps of defining a lifecycle model comprising a plurality of lifecycle states which can be assigned to the at least one computing component, wherein the plurality of lifecycle states comprises a production state and wherein the lifecycle management system ensures that the at least one computing component can be productively used only if it is assigned the production state, receiving a lifecycle transition request for assigning a requested target lifecycle state of the lifecycle model to the at least one computing component, assigning a conditional lifecycle state to the at least one computing component which is different from the requested target lifecycle state, and specifying at least one condition that has to be fulfilled in order for the at least one computing component to be assigned the requested target lifecycle state, and automatically assigning the requested target lifecycle state to the at least one computing component when the at least one condition is fulfilled.

Further advantageous modifications of embodiments of the method are defined in further dependent claims.

Lastly, certain example embodiments also concern a computer program comprising instructions for implementing any of the above-described methods.

3. BRIEF DESCRIPTION OF THE DRAWINGS

In the following detailed description, presently preferred embodiments are further described with reference to the following figures.

4. DETAILED DESCRIPTION

Managing the lifecycle of computing components, i.e. controlling that the computing components only transition from one lifecycle state to the next in a well-defined manner, is a central prerequisite for ensuring a proper operation of the computing system implemented by the computing components. Certain example embodiments depart from the simple concept of either approving or rejecting a requested lifecycle transition (as was explained further above in connection with FIGS. 1a and 1b) by introducing the concept of conditional approvals.

For example, when it is requested to move the status of a computing component (hereinafter also referred to as "asset") into an "In Production" lifecycle state, the approver could generally agree with the requested transition, but may want additional tests to be executed before moving the asset. Instead of having to reject the requested lifecycle transition (which would involve a complete additional iteration in the approval process), the approver is enabled to give the approval under the condition that certain additional tests are performed. If these tests are passed the asset can automatically be moved to the "In Production" lifecycle state without the involvement of the approver, which saves processing time and resources. In certain embodiments, conditional approvals can also be combined with runtime events. For example, in the event of a request to change the lifecycle state of an asset from "In Production" to "Retired" (also referred to as the "out of production" lifecycle state), the approver may be fine with the requested change, but to be sure that the asset is no longer in-use, the approver wants to ensure that there are no invocations for a certain period of time before the asset can be retired. The condition in this example is that there are no runtime invocation events for a certain period of time.

In certain embodiments, conditional approvals can be implemented by extending the definition of an approval process beyond just accepting rejecting a requested lifecycle transition. More flexibility can be achieved by allowing the approver to decide on the target lifecycle state for a requested lifecycle transition. If the target lifecycle state can be chosen by an approver, conditional approvals can be implemented by introducing additional lifecycle states with additional transitions to the target state. These transitions can be annotated with policies governing the final lifecycle state transitions. One advantage of this approach is that the status of the approval is indicated properly when looking at the asset.

Further, certain embodiments provide policies that can be parameterized. For example, the testing policy can provide a parameter that allows specifying the tests that have to be executed, and the runtime invocation policy can provide a duration parameter for specifying the monitoring time period. It is proposed that these parameters can be specified by an approving user or group via so-called fulfillment annotations, which will be explained in more detail below.

Moreover, events and event stream consuming policies can be used in certain embodiments to combine conditional approvals with runtime and/or design-time monitoring of SOA and/or API management assets. To address the previously described use cases, it is assumed that events channels transport test result events generated by testing tools and/or runtime invocation events generated by runtime policy enforcement points. Based on this event driven approach, other development and/or governance tooling can be easily combined with conditional approvals.

The various aspects of embodiments summarized above will be explained in more detail in the following:

Conditional Approvals

One concept underlying certain example embodiments is to add more flexibility to lifecycle management. Instead of just accepting or rejecting a requested lifecycle transition, it is proposed to extend the possible results of a lifecycle transition request. Accordingly, an approval process takes as input a requested lifecycle transition and returns a target lifecycle state or stage. This flexibility can be exploited for conditional approvals.

Figure 3:
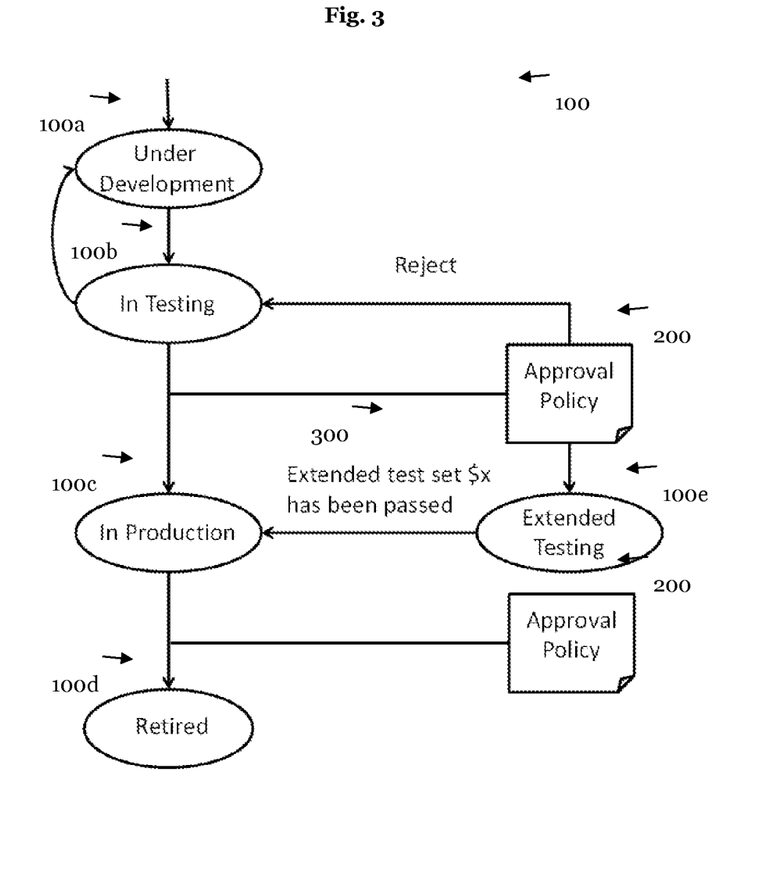
FIG. 3: An exemplary lifecycle model with a conditional approval triggering an extended testing according to one embodiment.

FIG. 3 shows a variation of the lifecycle model 100 already explained further above in connection with FIGS. 1a and 1b. As can be seen, the lifecycle model 100 of FIG. 3 comprises the lifecycle states "Under development" 100a, "In Testing" 100b, "In Production" 100c (also referred to as the "production state"), and "Retired" 100d (also referred to as the "out of production state"). In the example of FIG. 3, the transition (see the arrow in FIG. 3) between the "In Testing" state 100b and the "In Production" state 100c is annotated with a conditional approval policy 200.

The approval offers the approving group or user three options. The "Direct Approval" option follows the transaction requested by the user (from "In Testing" 100b to "In Production" 100c) and moves the asset to the "In Production" state 100c, so that it can be productively used by third parties. The "Reject" option moves the asset back to the "In Testing" state 100b. The third option provided by certain example embodiments goes over an additional lifecycle state 100e, in this example the "Extended Testing" state 100e which has a transition to the "In Production" state 100c. This transition carries the condition 300 of the conditional approval. The condition is defined by a policy that checks that a certain test set has been passed. The test set can be specified via a parameter (labeled "$x" in FIG. 3) to have greater flexibility. The test set can be specified by the approving user or the approving user group when extended testing is needed. These kinds of condition parameters are also called fulfillment annotations.

The above-described example shows how the conditional approval is attached to the standard lifecycle and how the lifecycle transition can be changed by the approval to a lifecycle state (in this case state 100e) different to the requested target state (in this case 100c). This means that the conditional approval does not simply accept or reject a requested lifecycle state change, but allows the approving user or group to determine the target lifecycle state of the considered asset and to specify one or more fulfillment annotations.

Apparently, this approach can be used to not just introduce a simple intermediate lifecycle state, but a whole sub-lifecycle process. For example, the "Extended Testing" state 100e may be expanded to comprise a complete sub-lifecycle containing several states, so that the lifecycle state 100e is actually a lifecycle stage. The conditional approval then can be used to trigger the sub-lifecycle covering the extended testing, based on the choice made by the approving user or group.

Conditional Group Approvals

If an approval has to be given not just by a group of users, the decisions of the approving users have to be consolidated. For conditional approvals it is not sufficient to just resolve the "accept" and "reject" decisions. Also, the conditions 300 that have been chosen by the approving users have to be considered. Furthermore, multiple users may choose the same condition 300 but with different fulfillment annotations. This means that also the variety of fulfillment annotations needs to be taken into account. The resolution strategies for simple approvals can be extended to conditional approvals in the following way:

Any: A requested lifecycle transition is accepted, if any of the specified conditions 300 with any of the specified fulfillment annotations is fulfilled by the considered asset.

All: A requested lifecycle transition is accepted, if all of the specified conditions 300 with all of the specified fulfillment annotations are fulfilled by the considered asset.

Design Time Monitoring

So far, it is left open how the successful passing of the extended tests can be verified. Amongst other possibilities, this can be done by so-called event based design-time monitoring. Design-time monitoring refers to the monitoring of metadata 20' in a registry 10 (cf. FIG. 2) representing SOA, API and/or other assets 20. Design-time monitoring can be extended to also cover the development and testing of assets 20. For example, test sets can also be stored in the registry 10 and assets 20, or respectively their descriptions in the registry 10, can be annotated with the test sets they already have passed.

For event based extended design-time monitoring, it is assumed that an event channel 40 (cf. again FIG. 2) transports events generated by the registry 10 on changes to the metadata 20'. These changes are not limited to create, update and delete operations, but may also cover lifecycle state changes and/or versioning. The events on the event channel 40 can be consumed by policies 200 stored in the registry 10. The event consuming policies 200 can react on single events as well as on whole event streams to verify complex conditions like the absence of certain events within a certain period of time. Another exemplary complex condition is to check for the existence of a certain number of events with a given time period.

Figure 2:
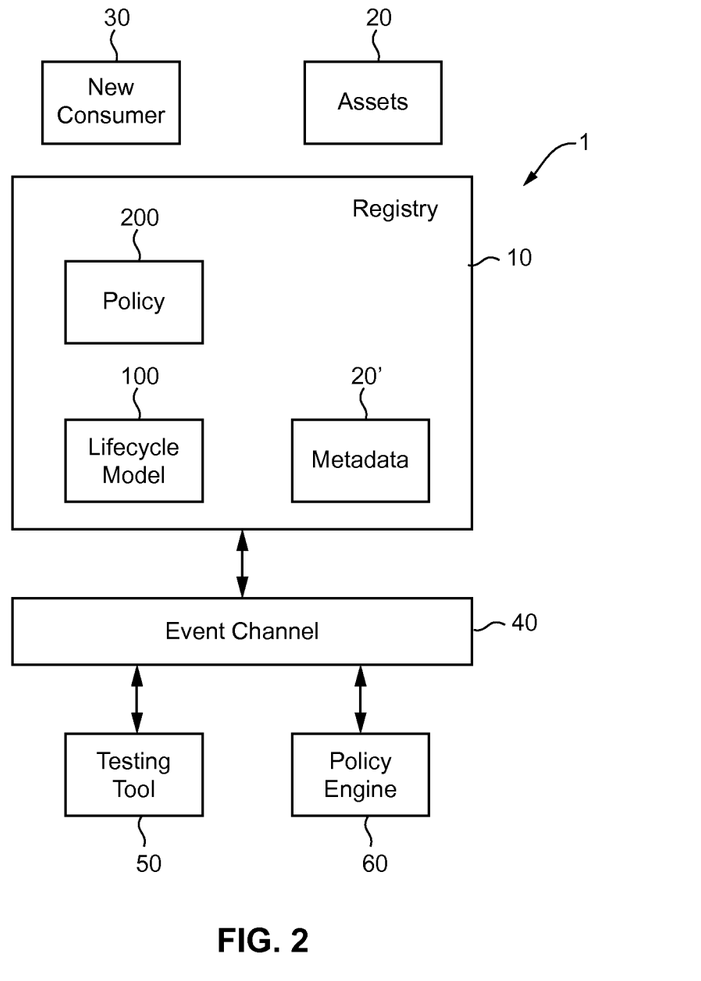
FIG. 2: A structural diagram illustrating a lifecycle management system 1 and its components according to one embodiment.

This event channel 40 can also transport events from other tools. For example, a testing tool 50 may send its test results as an event on the event channel 40. These events may carry information about the test set and the asset 20 that has been tested. This information can be checked by policies 200 that verify test results.

Runtime Monitoring

Figure 4:
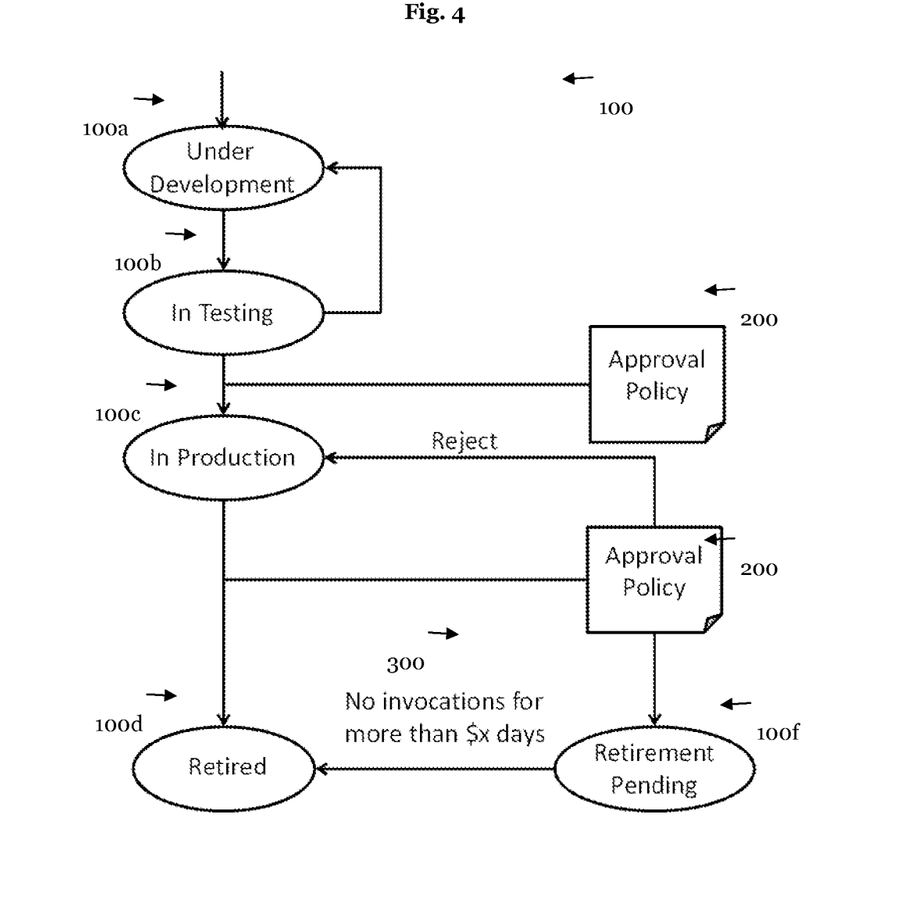
FIG. 4: An exemplary lifecycle model with a conditional approval triggering the checking of runtime events according to one embodiment.

Another advantage of conditional approvals can be leveraged by combining it with runtime monitoring. FIG. 4 illustrates another variation of the lifecycle model 100 discussed further above, which comprises the lifecycle states "Under developement" 100a, "In Testing" 100b, "In Production" 100c, and "Retired" 100d. In the lifecycle model 100 of FIG. 4, the conditional approval can move a given asset 20 to the "Retirement Pending" state 100f if the given asset 20 is supposed to be retired, i.e. put out of production. The "Retirement Pending" state 100f is another example of the additional conditional lifecycle state explained further above and has a transition to the "Retired" state mod that is annotated with a policy 200 that considers the invocation and/or usage of the given asset 20. With this lifecycle model 100 an approval user or group can define a grace period before the considered asset 20 is finally retired. For not being limited to a fixed time period, the condition 300 of the conditional approval has a fulfillment annotation that maps to a parameter of the policy attached to the transition between "Retirement Pending" and "Retired". The parameter defines the grace period of the asset retirement.

The example highlights the advantage of having the status of the approval transparently represented by additional lifecycle states 100e, 100f. The "Retirement Pending" state 100f can be considered equivalent to the "Retired" state mod for certain aspects. Assuming a policy 200 that disallows the registration of new consumers 30 (cf. FIG. 2) of an asset 20 in the "Retired" state mod, this policy 200 can be extended to also reject a new consumer 30 of the asset 20 in the "Retirement Pending" state 100f. Since the grace period can be e.g. defined terms of days and weeks, it is important to have a transparent lifecycle state assignment to perform lifecycle based governance during that time.

In this example, runtime invocations of the asset 20 are monitored. Such a monitoring can be performed e.g. by integrating runtime enforcement points and the registry 10 that is performing the lifecycle management via an event channel 40. As for the design-time monitoring, the registry 10 can execute policies 200 consuming single events or whole event streams from the event channel 40. In this example, a policy 200 verifies that there are no runtime invocation events on the runtime event channel 40 for a certain period of time. Runtime events can be created by runtime enforcement points in different ways. One approach is to provide virtual endpoints for native services. All calls to the virtual endpoint are mediated and forwarded to the native service. While doing this the runtime policy enforcement point collects various kinds of runtime monitoring data, such as invocation events and/or processing time.

Application Areas

As already explained above, the inventive concept of conditional approvals is particularly advantageous for the lifecycle management of computing components, such as SOA assets and/or API assets.

Figure 5A:
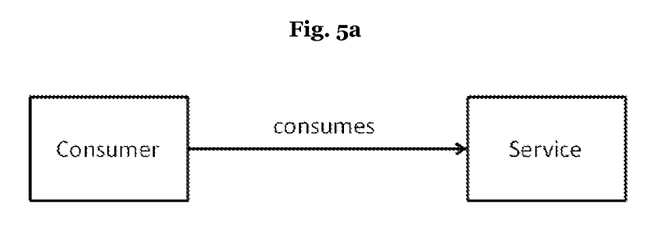
FIG. 5a: A graphical representation of exemplary metadata representing a consumer registration according to one embodiment.

Nevertheless, the present invention is not restricted to lifecycle management, but the concept of conditional approvals may also be applied e.g. to consumer management in a SOA and/or API management registry 10. Consumer registration generally refers to introducing a "consumes" relationship between a consumer asset and a service asset, as exemplarily illustrated in FIG. 5a.

Figure 5B:
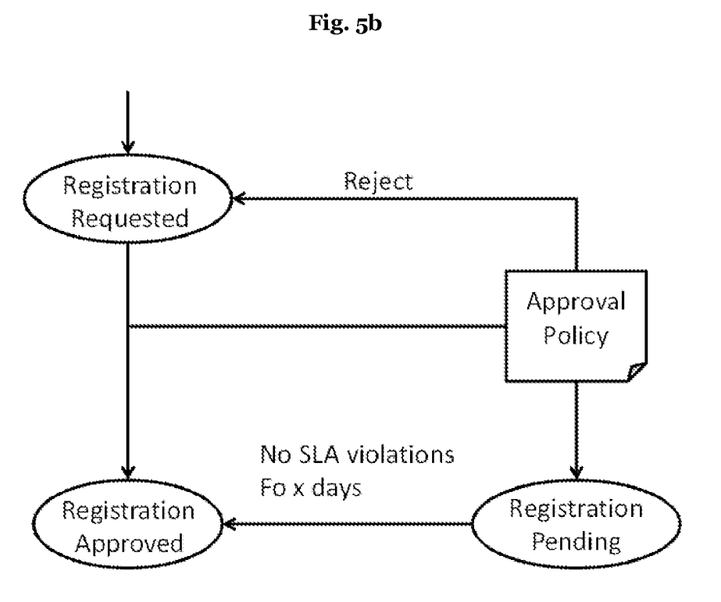
FIG. 5b: An exemplary lifecycle model with a conditional approval controlling consumer registration according to one embodiment.

The introduction of a consumer registration can be controlled with a simple lifecycle model that applies to the "consumes" relationship between the consumer 30 and the service asset 20. As illustrated in FIG. 5b, the exemplary lifecycle model comprises the lifecycle states "Registration Requested" and "Registration Approved". The transition therebetween has an approval policy controlling the consumer registration via human interaction.

The approval can be extended to a conditional approval to allow the approving user or group to a consumer registration under a condition that could be runtime related. For example, the consumer registration may become effective only if a certain service level agreement (SLA) has not been violated for a certain period of time. The SLA can be verified by checking the runtime events sent via the runtime event channel 40. The corresponding lifecycle model is shown in FIG. 5b, which comprises the additional lifecycle state "Registration Pending", which has a transition to the final "Registration Approved" lifecycle state. A policy is attached to the transition which checks that there are no SLA violations for a certain period of time. The time period can again be specified by the approving user or group via a fulfillment attachment of the conditional approval.

Exemplary Use Case

In the following, an exemplary application scenario for lifecycle management with conditional approvals is provided. In this example, a company SampleState.com provides an API that offers services to access the company's real estate database. SampleState.com provides the following service via the API:

GetRealEstates: Returns all the real estate information from their database

Since the database is growing, a service such as GetRealEstates which returns all information does not make sense anymore. Therefore, SampleState.com has developed new services which are ready to be put into production. These are:

GetRegions: Returns all regions considered by SampleState.com

Figure 6:
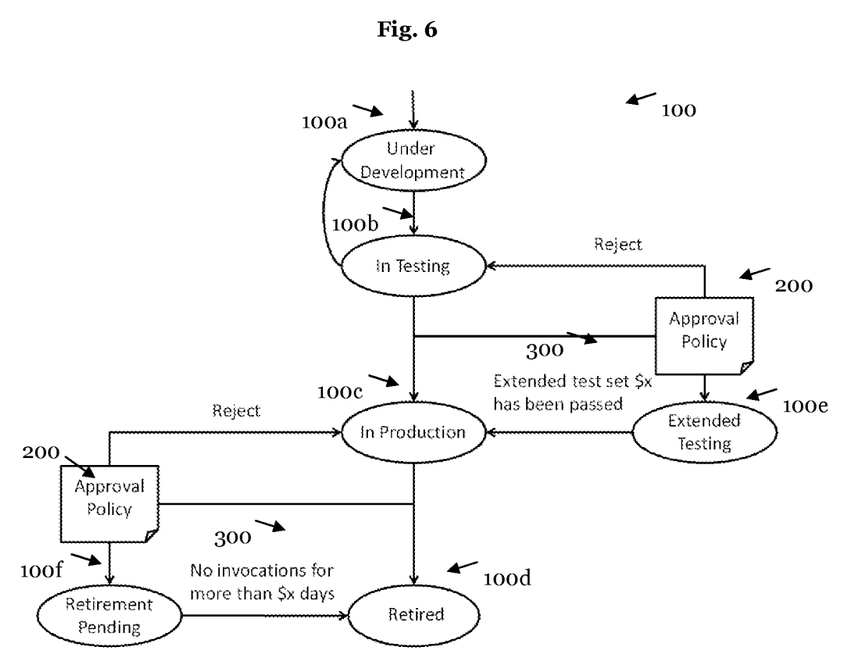
FIG. 6: An exemplary lifecycle model with conditional approvals in an exemplary use case according to one embodiment.

GetRealEstatesByRegion: Returns the real estate information for a specific region The old service GetRealEstates needs to be retired, i.e., put out of production, and the new services GetRegion and GetRealEstatesByRegion need to be put into production in a controlled way. Moreover, SampleState.com foresees a need for extending their service offer in the near future. To maintain the lifecycle of their services, SampleState.com has deployed the lifecycle model 100 exemplarily shown in FIG. 6. As can be seen, the lifecycle model 100 shown in FIG. 6 is a combination of the models described further above, which comprise the lifecycle states "Under development" 100a, "In Testing" 100b, "In Production" 100c, and "Retired" 100d. In the example of FIG. 6, the transition (see the arrow in FIG. 6) between the "In Testing" state 100b and the "In Production" state 100c is annotated with a conditional approval policy 200. The "Retirement Pending" state 100f also shown in FIG. 6 is another example of a conditional lifecycle state which has a transition to the "Retired" state and which is annotated with another conditional approval policy 200. The service GetRealEstates is currently in the lifecycle state "In Production" 100c. The new services "GetRegions" and "GetRealEstatesByRegion: have the lifecycle state "In Testing" 100b, respectively.

The first lifecycle transition request is to move the service "GetRegions" to the lifecycle state "In Production" 100c. Anne is a software architect of SampleState.com who is in charge of reviewing all services that are moved from "In Testing" 100b to "In Production" 100c Anne decides that the service "GetRegions" is already ready for production and approves the requested transition right away. Accordingly, the lifecycle management system assigns the lifecycle state "In Production" 100c to the service "GetRegions".

The next request is to move the service "GetRealEstatesByRegion" to the lifecycle state "In Production" 100c. Here, Anne thinks that the service is in principle ready for production, but to be sure that there will be no problems in production, she request some additional testing. The additional tests verify that "GetRealEstatesByRegion" can deal with large result sets Anne does not reject the transition, but moves the services into the lifecycle state "Extended Testing" 100e. Services in "Extended Testing" 100e are not yet considered to be in production, which means that consumers cannot register to these services.

After the new services have reached the "In Production" lifecycle state 100c, it is time to retire the old service "GetRealEstates". The requested transition needs to be approved by the product manager Paul in this example. Paul is concerned that the service "GetRealEstates" is still used although he has informed all customers 30 of the planned retirement. Therefore, Paul decides to wait thirty more days until the service can be finally moved to the "Retired" lifecycle state 100d and moves the service to the "Retirement Pending" lifecycle state 100f. New consumers 30 cannot register to services being in this state, but services in this state can still be used by existing consumers 30.

Exemplary Implementation

In the following, it will be described how conditional approvals can be implemented. In a preferred embodiment, the components of the implementation comprise (cf. also FIG. 2):

A registry 10, preferably a service or asset registry 10 with policy, lifecycle management and approval capabilities A policy engine 60 that supports the policies 200 consuming events and event streams Runtime policy enforcement points An Event channel 40 to combine the registry 10, the runtime policy enforcement points and other tooling 50

The implementation of runtime enforcement points is not the subject of these particular embodiments, but can be readily achieved using existing technology. The implementation of event channels 40 is also provided by already existing enterprise service bus (ESB) technologies or using frameworks, such as the Apache Camel integration framework. The same is true for the implementation of metadata registries 10 providing policy, lifecycle management and approval capabilities. Therefore, hereinafter the focus lies on the data needed to be processed through the event channel 40 and the metadata which needs to be stored in the registry 10.

As already explained, the basis for a SOA governance and/or API management solution is a registry 10 which manages the metadata 20' for the SOA and/or API assets 20. The metadata 20' may be stored in XML format (as used in the examples hereinafter), or any other suitable storage format.

The following example shows the XML representation of the metadata 20' for a service called "RealEstate":

```
<asset id="realestate-service-id" type="service">
    <name>RealEstate</name>
    <end-point>
        http://www.realestate.com/sercive
    </end-point>
    <lifecycle-state>
        under-development-id
    </lifecycle-state>
</asset>
```

The simplified XML representation defines the name of the asset 20 and its id (identifier). In addition, it defines the access URI (element "end-point") and the lifecycle state reference (element "lifecycle-state"). The service presently is assigned the lifecycle state "Under Development" and thus it references the "Under Development" lifecycle state of the following lifecycle model:

```
<lifecycle-model id="service-lcm-id">
    <name>Service Lifecycle Model</name>
    <asset-type>service<asset-type>
    <state id="under-development-id">
        <name>Under Development</name>
```

```xml
</state>
<state id="in-testing-id">
    <name>In Testing</name>
</state>
<state id="in-production-id">
    <name>In Production</name>
</state>
<state id="pending-id">
    <name>Retirement Pending</name>
</state>
<state id="retired-id">
    <name>Retired</name>
</state>
<transition id="transition-to-testing">
    <source>under-development-id</source>
    <target>in-testing-id</target>
</transition>
<transition id="transition-to-production">
    <source>in-testing-id</source>
    <target>in-production</target>
</transition>
<transition id="transition-to-retired">
    <source>in-production</source>
    <target>retired-id</target>
</transition>
<transition id="pending-to-retired">
    <source>pending-id</source>
    <target>retired-id</target>
</transition>
</lifecycle-model>
```

As asset metadata, lifecycle models are also stored in the registry 10. The approval policies and the conditional approval policies are preferably stored in separate XML objects. A simplified XML representation of the conditional approval policy looks as follows:

```xml
<lcm-policy>
    <transition>transition-to-retired</transition>
    <action>Approval</action>
    <action-parameters>
        <approver>...<approver>
        <reject-state>in-production-id</reject-state>
        <result-options>
            <option>
                <state>pending-id</state>
                <parameter type="xs:duration"
                    name="x"/>
            </option>
        </result-options>
    </action-parameters>
</lcm-policy>
```

The approval policy is a lifecycle model policy. It references the transition it is attached to and the action it is performing. Since it is an approval policy it references the approval action. Policy actions may be specified in an arbitrary scripting or programming language such as Java.

Beside the transition and the action the policy references action parameters. The action parameters of the approval policy comprise the approver, the reject state and the possible result options. Each result option comes with a state reference and an optional parameter for the fulfillment annotation. The following simplified XML data shows the policy that verifies the runtime invocation:

```xml
<lcm-policy>
    <transition>pending-to-retired</transition>
    <action>CheckRuntimeInvocations</action>
    <action-parameters>
        <duration>
            <parameter type="xs:duration"
                name="x"/>
        </duration>
    </action-parameters>
</lcm-policy>
```

The policy is attached to the transition from "Retirement Pending" to "Retired". It references the action "CheckRuntimeInvocations", which verifies that there are no runtime invocations on a given asset for a given period of time. The time period is given by the duration parameter of the policy.

A possible implementation of the "CheckRuntimeInvocations" action is illustrated by the following pseudo code:

```
CheckRuntimeInvocations {
    boolean condition(EventStream s, Transition t,
        Duration d) {
        Asset asset = t.getAsset( );
        DateTime guardTime = c.getCurrentTime( ) + d;
        Event e = s.getNextEvent(guardTime))
        while(true) {
            if(e == null) //true if there are no
                events {
                return true;
            }
            if(e.getTimeStamp( ) >= guardTime) {
                return true;
            }
            if(e.getProvider( ).getEndPoint( ) ==
                asset .getEndPoint( )) {
                return false;
            }
            e = s.getNextEvent(guardTime));
        }
    }
}
```

The pseudo code illustrates a simple algorithm which verifies for a requested lifecycle transition that there are no invocation events on the monitored event stream. The requested transition references the asset that is supposed to change its lifecycle state. The asset and the event are correlated via the end-point of the asset. The event structure expected by the exemplary code is as follows:

```xml
<event>
    <header>
        <type>Invocation</type>
        <time>2013-04-04T12:20:46.275+01:00</time>
    </header>
    <body>
        <invocation>
            <consumer>
                <ip>169.22.10.12</ip>
            </consumer>
            <provider type="SOAP Service">
                <end-point>
                    http://www.realestate.com/ser
                    vice
                </end-point>
            </provider>
        </invocation>
    </body>
</event>
```

Apparently, the simple algorithm shown above may be replaced with any more advanced event processing technology without leaving the scope of the invention.

It will be appreciated that as used herein, the terms system, subsystem, service, engine, module, programmed logic circuitry, computing component, and the like (e.g., including for example the term lifecycle management system) may be implemented as any suitable combination of software, hardware, firmware, and/or the like. In other words, these terms may include processing resources such as, for example, at least one processor and a memory, suitable for carrying out instructions for performing specific functions. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. Such storage media may be used to store, for example, the registry, descriptions, events, requests, policies, etc., described herein. It also will be appreciated that the techniques described herein may be accomplished by having at least one processor execute or otherwise perform instructions that may be tangibly stored on a non-transitory computer readable storage medium.

What is claimed is:

1. A lifecycle management system for at least one computing component, comprising:
    at least one processor and a memory, wherein the at least one processor is configured to aid in defining a lifecycle model comprising a plurality of lifecycle states assignable to the at least one computing component, the plurality of lifecycle states comprising a production state, and the lifecycle management system ensuring that the at least one computing component is productively usable only if it is assigned the production state; and
    an input interface configured to receive a lifecycle transition request for assigning a requested target lifecycle state of the lifecycle model to the at least one computing component;
    wherein the at least one processor is further configured to control the lifecycle management system to at least:
        assign a conditional lifecycle state to the at least one computing component which is different from the requested target lifecycle state,
        specify at least one condition that has to be fulfilled in order for the at least one computing component to be assigned the requested target lifecycle state, and
        automatically assign the requested target lifecycle state to the at least one computing component when the at least one condition is fulfilled;
    wherein the at least one processor is still further configured to control the lifecycle management system to at least:
        respond to the received lifecycle transition request by assigning the conditional lifecycle state, specifying the at least one condition, and automatically assigning the requested target lifecycle state to the at least one computing component, and
        store to a registry of the lifecycle management system a representation of the lifecycle model and a description of the at least one computing component, as well as a conditional approval policy that references a transition to which the conditional approval policy is attached, an action to be performed, and possible result options, each said possible result option in turn including a state reference; and
    wherein the conditional lifecycle state is implemented in connection with the conditional approval policy.

2. The lifecycle management system of claim 1, wherein the at least one computing component is automatically deployed to a productive environment when the at least one computing component is assigned the production state.

3. The lifecycle management system of claim 1, wherein the at least one condition is defined in at least one policy and comprises at least one parameter, the value of which is specifiable by an approving entity.

4. The lifecycle management system of claim 1, wherein at least one policy is associated with the lifecycle transition request and comprises a plurality of conditions; and
    wherein the lifecycle management system ensures that the at least one computing component is assigned the requested target lifecycle state, if
    any of the plurality of conditions is fulfilled; or
    all of the plurality of conditions are fulfilled.

5. The lifecycle management system of claim 1, wherein the description comprises a lifecycle property that indicates the current lifecycle state of the computing component.

6. The lifecycle management system of claim 5, further comprising an event channel and a policy engine;
    wherein the registry is configured to issue an event on the event channel indicating a lifecycle transition request for the at least one computing component; and
    wherein the policy engine is configured to consume the event and to process the lifecycle transition request in accordance with at least one associated policy.

7. The lifecycle management system of claim 1, wherein the requested target lifecycle state is the production state, wherein the conditional lifecycle state is an extended testing state, and wherein the at least one condition of at least one associated policy specifies at least one test that has to be passed by the computing component before it is assigned the production state.

8. The lifecycle management system of claim 1, wherein the requested target lifecycle state is an out of production state, wherein the conditional lifecycle state is a retirement pending state, and wherein the at least one condition of at least one associated policy specifies that the computing component can be assigned the out of production state, if it is not invoked for a defined time period.

9. The lifecycle management system of claim 1, wherein the at least one computing component is a Service-oriented architecture (SOA) asset and/or an Application Programming Interface (API) asset.

10. The lifecycle management system of claim 1, wherein the lifecycle model comprises at least one lifecycle state that comprises a plurality of nested lifecycle states.

11. The lifecycle management system of claim 1, wherein each said computing component is a discrete computing component.

12. The lifecycle management system of claim 1, wherein each said computing component is a service programmed for use in a service-oriented architecture.

13. The lifecycle management system of claim 1, wherein the at least one processor is further configured to control the lifecycle management system to at least specify at least one condition that has to be fulfilled in order for the at least one computing component to be assigned the requested target lifecycle state if the conditional lifecycle state is entered into.

14. A computer-implemented method for managing the lifecycle of at least one computing component by a lifecycle management system, the method comprising:
    defining a lifecycle model comprising a plurality of lifecycle states that can be assigned to the at least one computing component;
    wherein the plurality of lifecycle states comprises a production state and wherein the lifecycle management system ensures that the at least one computing component can be productively used only if it is assigned the production state;

receiving a lifecycle transition request for assigning a requested target lifecycle state of the lifecycle model to the at least one computing component;

assigning a conditional lifecycle state to the at least one computing component that is different from the requested target lifecycle state, and specifying at least one condition that has to be fulfilled in order for the at least one computing component to be assigned the requested target lifecycle state; and automatically assigning the requested target lifecycle state to the at least one computing component when the at least one condition is fulfilled, the method further comprising:

responding to the received lifecycle transition request by assigning the conditional lifecycle state, specifying the at least one condition, and automatically assigning the requested target lifecycle state to the at least one computing component; and storing to a registry of the lifecycle management system a representation of the lifecycle model and a description of the at least one computing component, as well as a conditional approval policy that references a transition to which the conditional approval policy is attached, an action to be performed, and possible result options, each said possible result option in turn including a state reference; and wherein the conditional lifecycle state is implemented in connection with the conditional approval policy.

15. The method of claim 14, further comprising automatically deploying the at least one computing component to a productive environment when the at least one computing component is assigned the production state.

16. The method of claim 14, wherein the at least one condition is defined in at least one policy and comprises at least one parameter, the value of which is specifiable by an approving entity.

17. The method of claim 16, wherein at least one policy is associated with the lifecycle transition request and comprises a plurality of conditions; and wherein the method further comprises:

ensuring, by the lifecycle management system, that the at least one computing component is assigned the requested target lifecycle state, if
any of the plurality of conditions is fulfilled; or
all of the plurality of conditions are fulfilled.

18. A non-transitory computer readable storage medium tangibly storing a computer program comprising instructions for implementing a method according to claim 14.

19. A lifecycle management system for at least one computing component, comprising:

means for defining a lifecycle model comprising a plurality of lifecycle states that can be assigned to the at least one computing component;

wherein the plurality of lifecycle states comprises a production state, and wherein the lifecycle management system ensures that the at least one computing component can be productively used only if it is assigned the production state;

means for receiving a lifecycle transition request for assigning a requested target lifecycle state of the lifecycle model to the at least one computing component;

means for assigning, in response to the received lifecycle transition request, a conditional lifecycle state to the at least one computing component which is different from the requested target lifecycle state, and for specifying, in response to the received lifecycle transition request, at least one condition that has to be fulfilled in order for the at least one computing component to be assigned the requested target lifecycle state; and means for automatically assigning, in response to the received lifecycle transition request, the requested target lifecycle state to the at least one computing component when the at least one condition is fulfilled;

registry means for storing a representation of the lifecycle model and a description of the at least one computing component, as well as a conditional approval policy that references a transition to which the conditional approval policy is attached, an action to be performed, and possible result options, each said possible result option in turn including a state reference; and wherein the conditional lifecycle state is implemented in connection with the conditional approval policy.

* * * * *